United States Patent [19]
Caperton

[11] 3,779,658
[45] Dec. 18, 1973

[54] COUPLING MEANS FOR SEWER ROD

[76] Inventor: Charles B. Caperton, 52 Pitney Ave, Springlake, N.J. 07762

[22] Filed: June 6, 1972

[21] Appl. No.: 260,142

[52] U.S. Cl. .......................................... 403/393
[51] Int. Cl. ............................................ F16b 7/18
[58] Field of Search ................... 287/105, 116, 104, 287/78, 65, 117; 279/101; 15/104.3 SN

[56] References Cited
UNITED STATES PATENTS

| | | | |
|---|---|---|---|
| 2,168,759 | 8/1939 | Betzing | 287/104 |
| 2,315,414 | 3/1943 | Germany | 287/104 |
| 1,975,244 | 10/1934 | Wiseman | 287/105 X |

*Primary Examiner*—Andrew V. Kundrat
*Attorney*—Henry N. Paul, Jr. et al.

[57] ABSTRACT

Coupling means connects short individual sections of steel rod into a long continuous length of rod, for clearing obstructions in underground pipe, sewers and other conduits, and provides transmission of applied axial and torque forces from one rod to the next without slippage therebetween and without loss of power. The ends of the rods are shaped symmetrically relative to the center axis. Several different coupling means are disclosed.

5 Claims, 10 Drawing Figures

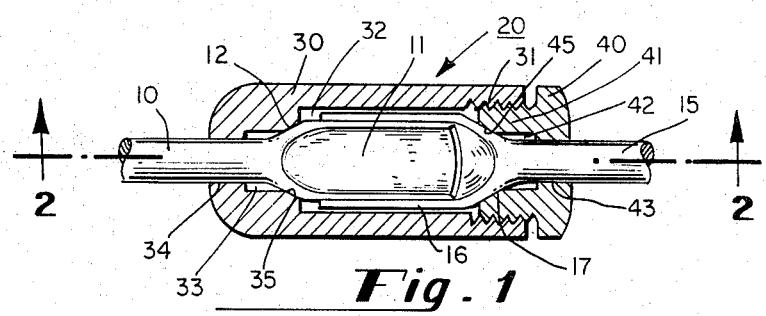
Fig. 1
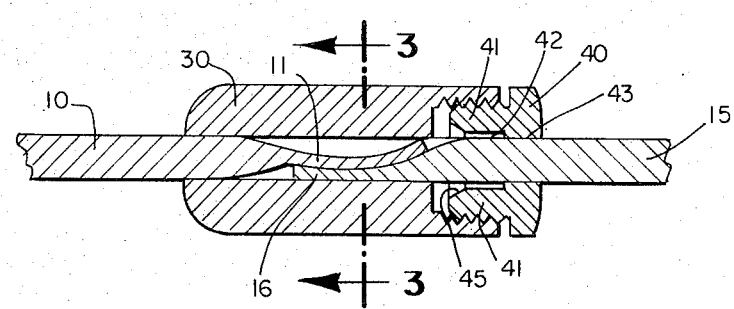
Fig. 2
Fig. 3
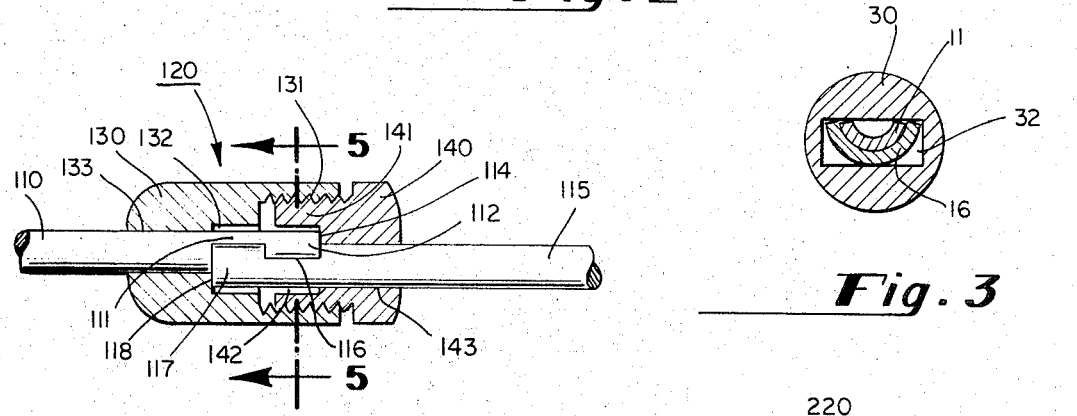
Fig. 4
Fig. 5
Fig. 6

COUPLING MEANS FOR SEWER ROD

BACKGROUND OF THE INVENTION

This invention relates to couplers for connecting together short sections of cylindrical spring-steel rod to form a continuous length of rod which may be pushed into a sewer or other pipe or conduit for the purpose of clearing obstructions therein. Each section of rod may, for example, have a length of the order of 39 inches. The continuous length of rod which results from coupling together the short sections may have a length of the order of 900-1000 feet. At the foremost extremity of the coupled rod, a suitable tool is connected for performing a particular clearing operation. Such tool may, for example, be an auger bit, a root saw, a centrifugal cutter, or any other of a large variety of tools especially adapted for the purpose. In order for the tool, particularly a cutting tool, to be effective, it is necessary for the coupled rod to be rotated axially. Thus, the couplers must be able to transmit torsional forces from one rod to the next, as well as to transmit axial forces, i.e., push and pull forces.

Couplers have been provided by the prior art but such couplers have certain disadvantages, which will be pointed out. These prior art couplers have two axially spaced holes, on opposite sides at its side wall, for receiving the terminal ends of the two rod sections which are to be connected together. The rod sections, when coupled, do not physically touch each other. The connection is through the coupler. In order for the terminal end of each rod section to be inserted into the hole in the side wall of the coupler, the short terminal end of the rod must be bent at right angles to its longitudinal axis. This has been possible with spring steel rod of a diameter of one-fourth inch – five-eighths inch. A demand has arisen, however, for heavier spring steel rod, and the bending at right angles of the short terminal end of such rod presents a difficult problem.

SUMMARY OF THE INVENTION

A principal object of the present invention is to provide coupling means for sections of spring steel rod which does not require bending of the short terminal end of each rod at right angles to its axis.

Another object is to provide coupling means as aforesaid in which the ends of the rod sections are shaped symmetrically on either side of the center axis.

Another object is to provide coupling means in which the two rod sections connect physically with each other, with the coupling means providing the necessary clamping force.

BRIEF DESCRIPTION OF THE DRAWINGS

FIG. 1 is a side view, partly in section, of one form of coupling means provided in accordance with the present invention.

FIG. 2 is a view, in section, looking along the line 2—2 of FIG. 1.

FIG. 3 is an end view, in section, looking along the line 3—3 of FIG. 2.

FIG. 4 is a side view, partly in section, of another form of coupling means according to the present invention.

FIG. 5 is an end view, in section, looking along the line 5—5 of FIG. 4.

FIG. 6 is a side view, partly in section, of still another form of coupling means according to the present invention.

DETAILED DESCRIPTION OF THE PREFERRED EMBODIMENTS

Figure 7:
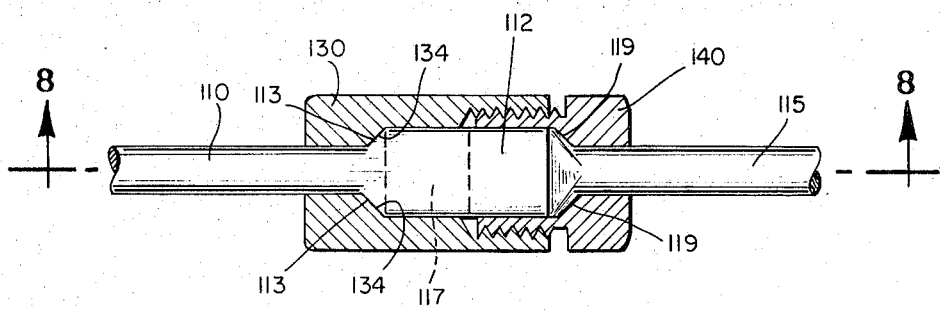
FIG. 7 is a plan view, partly in section, of yet another form of coupling means according to the present invention.

Referring first to the species shown in FIGS. 1, 2 and 3, the terminal ends of cylindrical rod sections 10 and 15 are flattened and dished into generally similar spoon-like shapes 11 and 16, respectively, adapted for nesting or inter-fitting, as illustrated in FIGS. 1, 2 and 3. It is to be noted that these dished ends 11 and 16 are symmetrical on each side of the center axis of the rods. This is one of the features which distinguishes over the prior art rod section ends which were bent at right angles to form an L-shaped end.

Referring now to coupler 20, the coupler 20 comprises two components parts 30 and 40. Component part 30, which is the larger of the two, is generally cylindrical and has an open end internally-threaded at 31. Beyond the internally-threaded end portion is, in order, a major recess 32, a minor recesss 33, and a cylindrical through hole 34 in the end of the part. The major recess 32 is rectangular in cross section, as best seen in FIG. 3. Recess 32 is of such size as to allow the inter-fitted dished ends 11 and 16 to be slip-fitted snugly into the rectangular recess 32. The shoulder 35 at the junction of the major and minor recesses 32 and 33 is beveled for receiving the inclined surface 12 formed at the junction of the dished end 11 with the cylindrical rod 10.

The other component part 40 of coupler 20 has an externally threaded shank 41 adapted to be received within the internally threaded open-end portion of component part 30. Part 40 has a central recess 42 in the shank portion 41 and a through hole 43 through which the cylindrical rod 15 passes. The interior edge 45 of the annular shank 41 is beveled for bearing against the inclined surface 17 formed at the junction of the dished end 16 and the cylindrical rod 15.

It will be seen that in the form of coupling means shown in FIGS. 1, 2 and 3, if either an axial or a torsional force is applied to one of the rods 10 and 15, such force is transmitted by the coupling means to the other rod without any loss. For example, if a rotational force is applied to rod section 15, such force will be transmitted through the inter-fitted dished ends 16 and 11, which are snugly fitted in recess 32, to the other rod section 10. Similarly, if an axial force, in either direction, is applied to either of the rod sections, such force will be transmitted through the coupling means 20 to the other rod section.

It is to be noted that in the embodiment shown in FIGS. 1-3, since both ends of both rod sections 10 and 15 are flattened and dished, and since the coupling elements 30 and 40 cannot be slid onto the cylindrical rod sections 10 and 15 after both ends have been formed, it is necessary that the coupler elements 30 and 40 be placed on the cylindrical rod sections at least prior to the forming of the second end.

FIGS. 4 and 5 illustrate another form of coupling means comprising a coupler 120 having two component parts 130 and 140 which function to couple together the rod sections 110 and 115. In this embodiment, the ends of the rod sections 110 and 115 are formed, as by milling or otherwise, into the shapes illustrated wherein each of the ends of each of rod sections 110 and 115 has a transverse groove, 111 and 116, respectively, inward of the end of the rod leaving between the groove and the end of the rod section a flange portion 112 and 117, respectively, which is adapted to enter into the groove of the other rod.

Coupler part 130 has an internally-threaded open end portion 131, a recess 132, and a through hole 133 through which the cylindrical rod section 110 passes. Coupler part 140 has an externally-threaded shank 141 having therein a recess 142, and a through hole 143 through which the cylindrical rod 115 passes.

Unlike the embodiment shown in FIGS. 1–3, the formed ends of the rod sections 110 and 115 in FIGS. 4 and 5 will pass through the through hole 133 and 143. Accordingly, the coupler elements 130 and 140 may be inserted onto the rods 110 and 115 after the ends are formed. It is to be noted, in FIGS. 4 and 5, that the depth of the grooves 111 and 116, and the height of the flanges 112 and 117, are such that when the ends of the adjacent rod sections 110 and 115 are inter-fitted or interlocked, the center axis of the one rod section 110 is not in axial alignment with that of the other. Accordingly, in FIGS. 4 and 5, the through hole 143 in element 140 is the coupler element 140 not on the center axis of the element 140. As a result, a portion of the end face 114 of rod section 110 projects laterally beyond the cylindrical surface of rod section 115 forming a shoulder against which the coupler part 140 presses when the two coupler parts 130 and 140 are tightened. Similarly, the end face 118 of rod section 115 has a portion which projects laterally beyond the cylindrical surface of rod section 110, forming a shoulder against which the coupler part 130 presses when the coupler parts 130 and 140 are tightened. As a result, the inter-fitted ends of the two rod sections 110 and 115 are clamped tightly together, and both axial and torsional forces applied to one of the rod sections are transmitted without loss to the other.

It is to be noted that the coupler part 140, being mounted eccentrically on rod section 115, is not rotatable within part 130, but that part 130 is rotatable on part 140. Thus, the two component parts 130 and 140 of the coupler 120 are screwed together by rotating part 130 onto part 140.

FIG. 6 shows yet another form of coupling means comprising the coupler 220 having component parts 230 and 240. The ends of the rod sections 210 and 215 are formed in the manner shown in FIG. 6. It will be seen that the formation is generally similar to that of FIG. 4 except that the external surfaces of the flanged end portions 212 and 217 are tapered for receiving, respectively, the beveled or inclined inward surfaces 234 and 244 of the coupling elements 230 and 240. It will be seen that when the coupler parts 230 and 240 are screwed tightly together, by rotating part 230 onto part 240, the inter-fitted ends of the rod sections 210 and 215 are tightly interlocked and that axial and/or torsional forces applied to one of the rod sections are transmitted without loss to the other rod section.

Three embodiments have been illustrated and described. Various modifications may be made. For example, in the form shown in FIGS. 1–3, it is not essential that the ends 11 and 16 be dished. They could be flat. It is preferable, however, that the ends be dished since such dished shape contributes toward translating into a lateral or radial force component any axial force which may be applied to the rod sections. Since such lateral or radial force is opposed by the cylindrical body of the coupler part 30, the dished shape helps to keep the two rod sections tightly together during pulling or pushing of the rod.

However, since the inclined surfaces 12, 35, 17 and 45 also translate axial force into a lateral force component, dishing of the rod ends is not essential.

Figure 8:
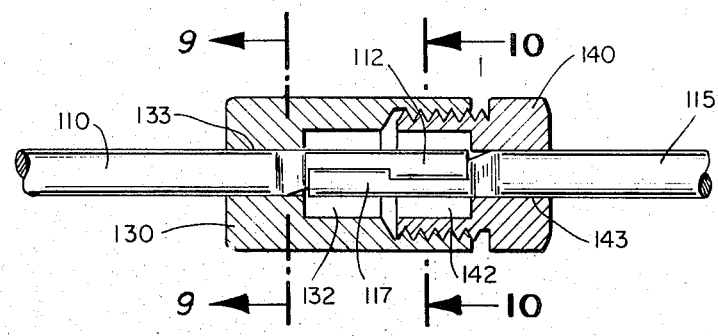
FIG. 8 is a side view, in section, looking along the line 8—8 of FIG. 7.
Figure 9:
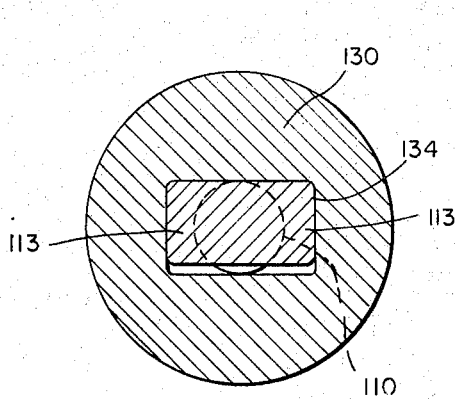
FIG. 9 is an end view, in section, looking along the line 9—9 of FIG. 8.
Figure 10:
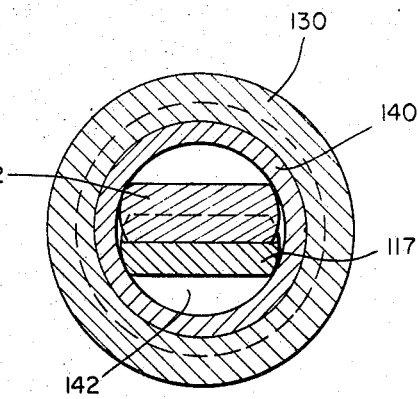
FIG. 10 is an end view, in section, looking along the line 10—10 of FIG. 8.

In the embodiments shown in FIGS. 4 and 6, the interlocked end portions of the two rods may be flattened, as shown in FIGS. 7–10 to form inclined shoulders 113 and 119 comparable to that of shoulders 12 and 17 of FIG. 1. If this be done, the end-face shoulders 114 and 118 of FIGS. 4–6 are not essential, and the rod sections may be connected together with their center axes in axial alignment, as seen in FIGS. 7–10. The recesses 132-142 which receive the flattened ends 112 and 117 are circular in cross-section and have a diameter corresponding to the increased width of the flattened ends, and the inclined shoulders 113 and 119 may fit into niches or bear against inclined surfaces at the junction of recesses 132 and 142 with holes 133 and 143, respectively.

It will be seen that, by the present invention, means are provided for coupling together axially two rod sections without the necessity of bending the ends of the rods at right angles to the rod axis, and that this is done by matingly shaping the ends of the rods, overlapping the shaped ends, and using the coupler to clamp the overlapped ends so tightly that torsional and axial forces may be transmitted from one rod section to the other without loss.

What is claimed is:

1. In combination
   a. a plurality of cylindrical metal rods,
      a-1. each rod having its opposite ends shaped symmetrically relative to the longitudinal axis of the rod;
      a-2. end portions of the rods being flattened and spread symmetrically to both sides of the rod center axis;
      a-3. said flattend spread end portions of said rods forming inclined shoulders at their junction with the cylindrical portion of said rod;
   b. coupling means for connecting said rods axially together in overlapping manner for transmitting axial and torsional forces from one rod to an adjacent rod without substantial loss, said coupling means comprising:
      b-1. first and second coupler components;
      b-2. said first coupler component being open at one end and having an internal recess;
      b-3. said second coupler component having a shank adapted to be received within said first coupler component;
      b-4. said recess of said first coupler component being adapted to receive overlapping portions of the ends of two adjacent rods;

b-5. said recess of said first coupler component being rectangular in cross section and of a size and shape to receive snugly the overlapping spread end portions of adjacent rods;

b-6. said first and second coupler components having inclined inner surfaces adapted to bear against said inclined shoulders.

2. The combination according to claim 1 characterized in that said overlapping spread end portions are dished.

3. In combination:

a. a plurality of cylindrical metal rods, a-1. each rod having its opposite ends shaped to provide a transverse groove inward of the rod end and a flange between said groove and terminal ends of the rod:

a-2. said flange at the end of one rod fitting into the groove of the adjacent rod when said rods are connected together in an overlapped manner;

b. coupling means for connecting said rods axially together in overlapped nammer for transmitting axial and torsional forces from one rod to an adjacent rod without substantial loss, said coupling means comprising:

b-1. first and second coupler components;

b-2. said first coupler component being open at one end and having an internal recess;

b-3. said second coupler component having a shank adapted to be received within said first coupler component;

b-4. said recess of said first coupler component being adapted to receive overlapping portions of the ends of two adjacent rods;

b-5. said second coupler component having an external threaded shank and a through bore located off the central axis of the shank.

4. The combination according to claim 3 characterized in that:

a. the exterior surface of the flange portion is tapered;

b. internal portions of said first and second coupler components have inclined surfaces for bearing against the tapered surfaces of the flange portions.

5. In combination:

a. a plurality of cylindrical metal rod sections;

a-1. each rod section having its opposite integral end portions flattened and spread to both sides of the center axis of the rod section so as to form a substantially rectangular cross-sectional end portion;

a-2. said flattened spread end portions forming at each end of the rod opposing flat surfaces and inclined shoulders at their junction with the cylindrical portion of said rod;

a-3. one of said opposing flat surfaces being provided with a transverse groove inward of the end of the rod section forming a flange between said groove and the terminal end of the rod section;

a-4. said flange at the end of one rod section fitting into the groove of the adjacent rod section when said rods are interfitted together in overlapping manner;

b. coupling means for connecting said rod sections axially together in overlapping manner for transmitting axial and torsional forces from one rod section to an adjacent rod section without substantial loss, said coupling means comprising:

b-1. first and second coupler components;

b-2. said first coupler component having at one end an internally threaded shank and an internal recess of circular cross-section inward of said threaded portion of said shank;

b-3. said second coupler component having an externally threaded shank and an internal recess of circular cross-section substantially coextensive with said externally threaded portion of said shank;

b-4. said recesses of first and second coupler components having diameters corresponding to the width of said flattened spread end portions of said rod section, and adapted to receive overlapping interfitted end portions of two adjacent rods;

b-5. said coupler components having inclined surfaces adapted to bear in opposing directions against said shoulders of said rod sections when said coupler components are threaded together and tightened.

* * * * *